T. J. & G. M. CLARK.
Trucks.
No. 154,456.  Patented Aug. 25, 1874.
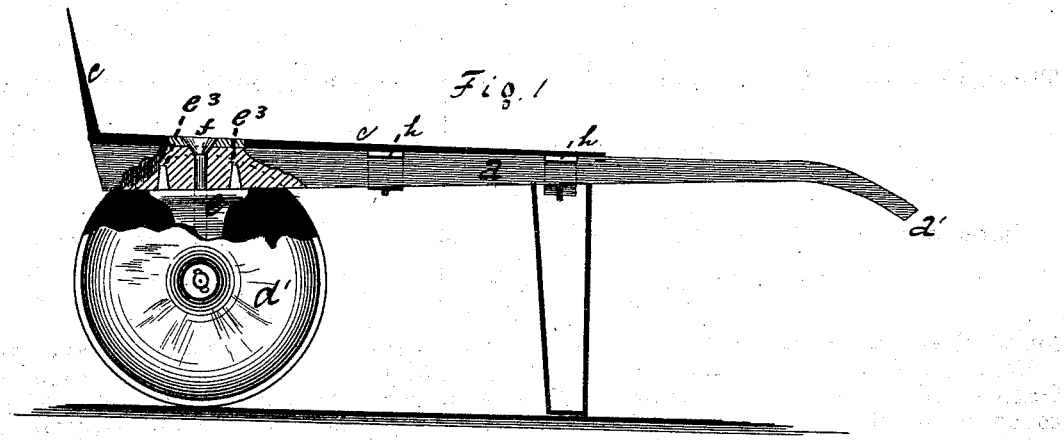
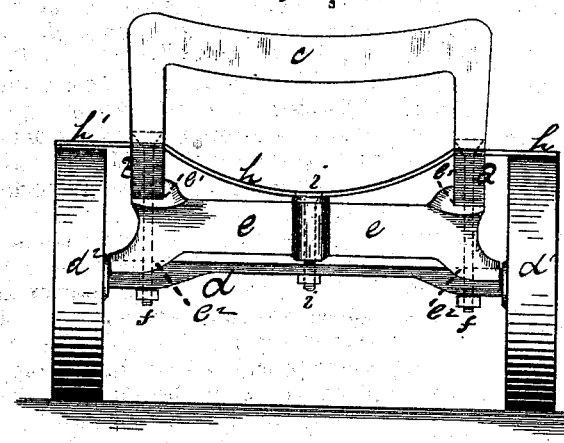
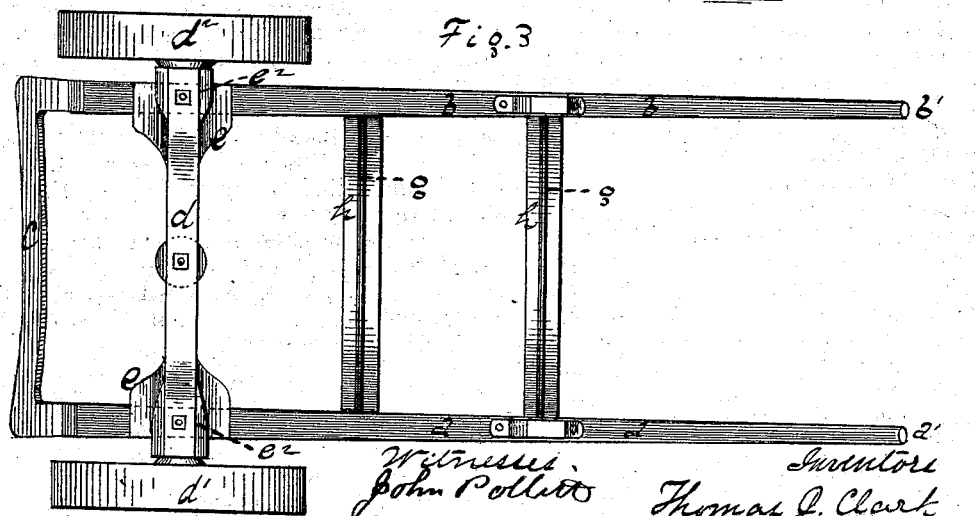

UNITED STATES PATENT OFFICE.

THOMAS J. CLARK AND GEORGE M. CLARK, OF HIGGANUM, CONNECTICUT.

IMPROVEMENT IN TRUCKS.

Specification forming part of Letters Patent No. 154,456, dated August 25, 1874; application filed June 24, 1874.

*To all whom it may concern:*

Be it known that we, THOMAS J. CLARK and GEORGE M. CLARK, of Higganum, in the county of Middlesex and State of Connecticut, have invented certain new and useful Improvements pertaining to Hand-Trucks, of which the following is a specification, reference being had to the accompanying drawings, where—

Figure 1 is a side view of a hand-truck embodying our said improvement, with a part of one of the wooden side pieces represented as broken away. Fig. 2 is a front end view of such truck. Fig. 3 is a bottom view of such truck.

The invention consists in the use and application of a casting of peculiar shape, for connecting the side pieces and frame to the axle of the wheels, whereby many advantages are obtained.

The letters $a$ and $b$ indicate the two side pieces, which may be of wood, as is common, and of the common shape, or nearly so, having handle $a^1$ and $b^1$ at the rear ends. To the tops of these side pieces is fastened the wrought-metal piece $c$, which is of the common shape. The side pieces are connected to the axle $d$, on the ends of which are the wheels $d^1$ $d^2$, through the medium of the casting $e$, which has sockets $e^1$ for the side pieces, and sockets $e^2$ for the axle. Dowels $e^3$ project from the casting $e$, and rest in corresponding mortises made in the under sides of the two side pieces. These dowels prevent all longitudinal play of the side pieces upon the piece $e$, and the sockets $e^1$ prevent sidewise play. Bolts $f$ run down through the piece $c$, the side pieces, the casting $e$, and the axle $d$, with nuts fastening the whole solidly together. Cross-rods $g$ and guards $h$ connect the two side pieces, much in the common fashion, the foremost having the ears $h^1$ $h^1$ to protect the wheels. The bolts $f$ run through this foremost guard, as well as through the other parts mentioned. A bolt, $i$, runs down through the center of the foremost guard, the casting $e$, and the axle $d$, with a nut underneath, increasing the strength and solidity of the structure.

The common method of fastening the side pieces to the axle is through the medium of V-shaped blocks of wood. By making the piece $e$ of metal, extending from one side to the other, with sockets for the axle underneath, we attain great strength and durability, and are enabled to make the axle much lighter, thereby effecting an important saving in that particular.

In the common kind of truck there are collars welded or fastened upon the axles near the ends, for the inner ends of the hubs of the wheels to abut against. In this truck we save the cost of these collars by having the abutting ends $s$ $s$ of the casting $e$ to take the place and serve the purpose of such collars.

We claim as our invention—

1. The combination of the side pieces $a$ $b$, the piece $e$ extending from one side piece to the other, and the axle $d$, united by bolts, substantially as shown and described.

2. The combination of the side pieces $a$ $b$, the piece $e$, extending from one side piece to the other, and bearing the dowels $e^3$, and the axle $d$, all united by bolts, substantially as shown and described.

3. The combination of the side pieces $a$ $b$, the piece $e$, extending from one side piece to the other, and having the abutting ends $s$, the axle $d$, and the wheels $d^1$ $d^2$, all substantially as shown and described.

THOMAS J. CLARK.
GEORGE M. CLARK.

Witnesses:
S. G. NORTH,
CLINTON B. DAVIS.